US008438076B2

(12) United States Patent
Graham et al.

(10) Patent No.: US 8,438,076 B2
(45) Date of Patent: May 7, 2013

(54) PRICE COMPARISON PROCESS AND SYSTEM

(75) Inventors: Paul C. Graham, Kalamazoo, MI (US); Eric M. Graham, Mattawan, MI (US); James Durham, Kalamazoo, MI (US)

(73) Assignee: Y-Check, LLC, Kalamazoo, MI (US)

( * ) Notice: Subject to any disclaimer, the term of this patent is extended or adjusted under 35 U.S.C. 154(b) by 407 days.

(21) Appl. No.: 12/704,713

(22) Filed: Feb. 12, 2010

(65) Prior Publication Data

US 2010/0211474 A1 Aug. 19, 2010

Related U.S. Application Data (60) Provisional application No. 61/152,348, filed on Feb. 13, 2009.

(51) Int. Cl.
*G06Q 30/00* (2012.01)
*G06F 17/30* (2006.01)

(52) U.S. Cl.
USPC .............. 705/26.64; 705/26.1; 705/26.61; 705/26.62; 726/5; 707/758

(58) Field of Classification Search ............... 705/26.1, 705/26.61, 26.62, 26.64, 27.1; 726/5; 707/758
See application file for complete search history.

(56) References Cited

U.S. PATENT DOCUMENTS

| 6,076,070 | A | 6/2000 | Stack |
| 7,127,414 | B1 | 10/2006 | Awadallah et al. |
| 7,302,429 | B1 | 11/2007 | Wanker |
| 7,451,106 | B1 | 11/2008 | Gindlesperger |
| 7,600,263 | B1 | 10/2009 | Nguyen et al. |
| 7,637,426 | B1 | 12/2009 | Green |
| 7,673,327 | B1 * | 3/2010 | Polis et al. ................ 726/5 |
| 7,908,647 | B1 * | 3/2011 | Polis et al. ................ 726/5 |
| 2005/0198119 | A1 * | 9/2005 | Lunenfeld .............. 709/203 |
| 2005/0222912 | A1 * | 10/2005 | Chambers ............... 705/26 |
| 2006/0116957 | A1 * | 6/2006 | May et al. ............... 705/40 |
| 2006/0136595 | A1 * | 6/2006 | Satyavolu .............. 709/229 |
| 2006/0155656 | A1 | 7/2006 | Kreder et al. |
| 2006/0253582 | A1 | 11/2006 | Dixon et al. |
| 2007/0073591 | A1 | 3/2007 | Perry et al. |
| 2007/0294149 | A1 | 12/2007 | Lu et al. |
| 2008/0016232 | A1 | 1/2008 | Yared et al. |
| 2008/0255967 | A1 | 10/2008 | Shi |
| 2010/0030661 | A1 * | 2/2010 | Friedland et al. .......... 705/27 |
| 2010/0223134 | A1 * | 9/2010 | Lunenfeld ............. 705/14.54 |

OTHER PUBLICATIONS

Anon., "UPS Subsidiary Offers Credit Card," Journal of Commerce, Jul. 7, 2000.*

(Continued)

*Primary Examiner* — Nicholas D Rosen
(74) *Attorney, Agent, or Firm* — Miller Canfield Paddock and Stone; John H. Engelmann (57) ABSTRACT

A data processing system is provided for obtaining client's real time pricing information from password protected secure data bases, and sending the client a price comparison report. If the web sites are secure, the system provides real time impersonation of the client in order to gain access to the web site.

18 Claims, 8 Drawing Sheets

OTHER PUBLICATIONS

The International Search Report and Written Opinion of the International Searching Authority for PCT/US2010/24007, date completed Mar. 18, 2010, date mailed Apr. 2, 2010.

http://www.americasmart.com; Home page, AmericasMart Atlanta—Apparel, Rug, Gift and Home Shows, web p. 1 of 1, printed Nov. 21, 2012.

http://www.americasmart.com/buyers-resource-center/exhibitor-catalog; Exhibitor Catalog—AmericasMart Atlanta, web p. 2 of 3, printed Nov. 21, 2012.

http://www.americasmart.com/buyers-resource-center/first-time-to-market; First Time to Market—AmericasMart Atlanta, web p. 1 of 1, printed Nov. 21, 2012.

* cited by examiner

Figure 1

System Architecture

Figure 2

User Authentication

Figure 3

Price Comparison Search Process Overview

Figure 4

Web Site Impersonation and Extraction Process

Figure 5

Web Service Impersonation and Extraction Process

Figure 6

Price Catalog Search

Figure 7

Automated FTP Impersonation and Import Process

Figure 8

Automated Email Import Process

PRICE COMPARISON PROCESS AND SYSTEM

CROSS REFERENCE TO RELATED APPLICATION

This application claims priority to U.S. Provisional Application Ser. No. 61/152,348, filed Feb. 13, 2009. The entire contents of the aforementioned application are incorporated herein.

FIELD OF TECHNOLOGY

The present disclosure relates to computer software and more particularly to a method, system and computer software for comparing prices for the same item from various wholesalers with whom the purchaser has a password protected account. This product price comparison software compares prices among various wholesalers where pricing data is confidential and secured by logon and password and is not available to the general public.

BACKGROUND

Price comparison web sites are currently quite popular and widely available to the general public. These sites allow a user to type in a search phrase and return results from many different retailers. Examples of such sites can be seen at www.Bizrate.com, www.PriceGrabber.com, and www.NextTag.com. These and other comparison sites only search and compile data regarding products and prices that are available for sale to the general public. These and other sites and shopping services do not and cannot provide comparison pricing that is available from wholesale distributors and vendors.

Independent retailers such as pharmacies, restaurants and others often buy items for resale from a specific group of wholesalers available in a geographic region. Retailers will frequently negotiate a purchase agreement with a primary wholesaler whereby the retailer agrees to buy a specified percentage of all purchases through the wholesaler in exchange for discount pricing, rebates, etc. In exchange for this purchase commitment, the independent retailer is granted special pricing, but this special pricing can vary greatly from retailer to retailer depending on the retailer's annual purchase volume, specific contractual obligations, buying group membership, chain code affiliation, available wholesaler stock, manufacturer/vendor promotions, expiration date of the product and other factors.

Once the retailer has a purchase agreement with a wholesaler, he generally takes it on faith that he is getting the best price, and while most retailers have a secondary and tertiary backup wholesaler, they do not aggressively compare prices because it is not convenient. Retailers are known to purchase large quantities of an item that are suddenly offered at very special reduced prices only to learn later that the same item was available from one of their alternate wholesalers at a lower price.

Some retailers with commitments to buy a specified percentage of total purchases from their primary wholesaler are reluctant to even purchase from a secondary wholesaler because they do not have a convenient method to quickly compare the savings from buying the secondary wholesaler item with the loss of rebate from the primary wholesaler.

If a retailer wants to seek out the best available price for an item, the retailer would have to manually check for a price at each contracted wholesaler's web site, through a POS (point of sale) system, an electronic price list, via telephone or even manually looking the item up in a catalog. This is a tedious and time consuming task for the retailer. The information returned in each of the previous examples would need to be compiled into a standardized list to be properly evaluated by the retailer. Consequently, retailers frequently continue buying from their primary wholesaler and assume they are getting the best price or at least a fair price, unaware of the savings available through another source and unable or unwilling to take the time and effort to compare prices.

Many wholesalers offer their retail customers product and price search capabilities on their websites. In order for the retailer to access this confidential information, each site usually requires unique user names and passwords. These unique user names and passwords can be created, maintained and recalled for each wholesale account.

What is needed is a method and system for automatically and rapidly compiling confidential pricing data from specifically contracted wholesalers in a manner that can be quickly and easily evaluated by the independent retailer. In so doing, the retailer is able to make an informed purchase decision.

SUMMARY

The present disclosure satisfies these needs and shortcomings by providing a method and system to automate the task of searching confidential price data from different individual wholesaler account websites and compiling this data into a standardized list useful for comparing prices.

The present disclosure further satisfies the aforementioned shortcomings by automating the compilation and search of wholesaler confidential pricing data not directly available from a web site. This information could be through other means such as email, file transfer, electronic data interchange, web services or other methods.

The present disclosure further satisfies the aforementioned shortcomings by allowing only one logon and password to search and compile the confidential pricing data. Impersonation can be used to authenticate, extract and compile information in its many different formats into a single standardized list.

BRIEF DESCRIPTION OF THE DRAWINGS

The above-mentioned and other features of this disclosure and the manner of obtaining them will become more apparent, and the disclosure itself will be best understood by reference to the following descriptions of methods, systems and software taken in conjunction with the accompanying figures, which are given as non-limiting examples only, in which.

The exemplifications set out herein illustrate embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

Figure 1:
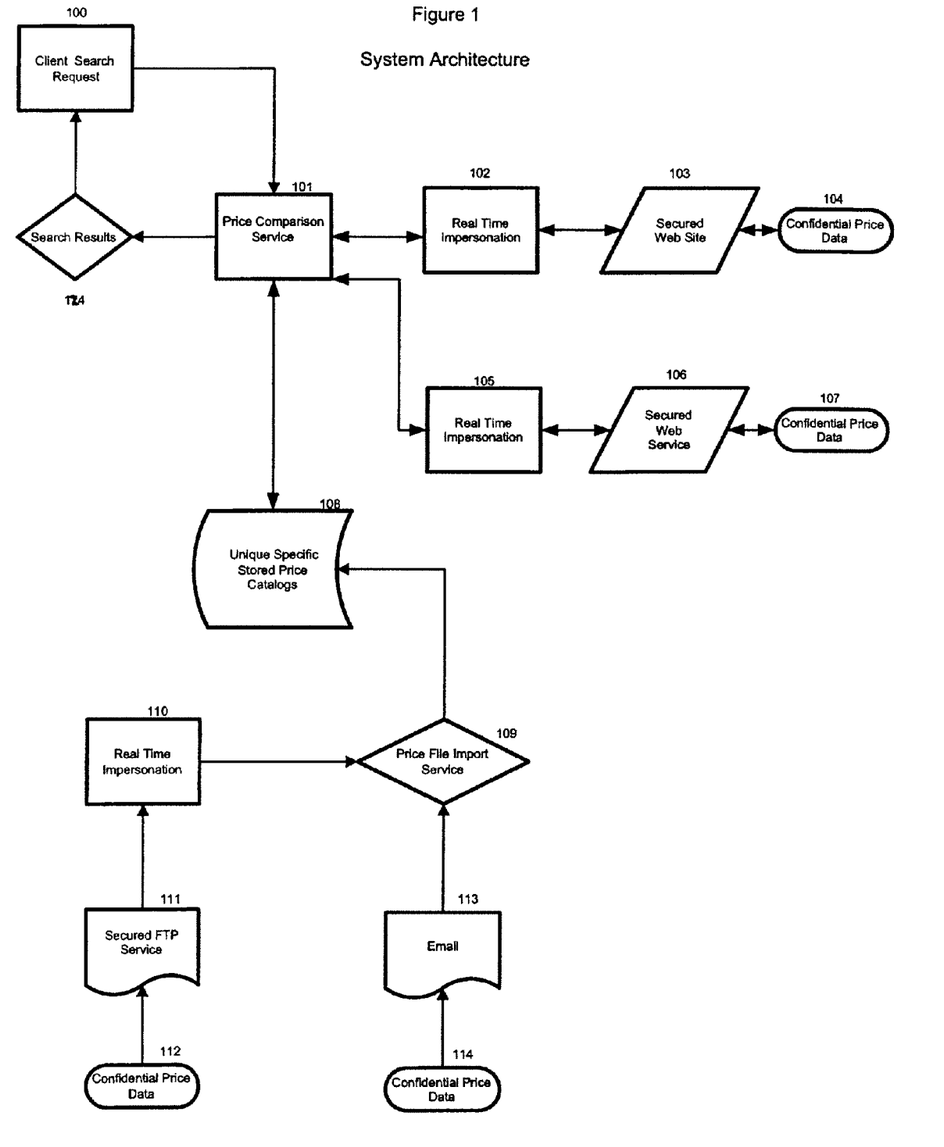
FIG. 1 is a block diagram illustrating a system architecture and method for comparing prices among various wholesalers where pricing data is confidential and secured by logon and password and not available to the general public.

FIG. 1 illustrates a system architecture and method for comparing prices among various wholesalers where pricing data is confidential, secured by logon and password and is distributed in various forms over different mediums. In a sample embodiment, a client search request 100 would be made to a price comparison service 101. The client search request in some sample embodiments could be made via a number of devices, including but not limited to a web browser, a PDA (personal digital assistant), a cell phone, email request or a computer software application.

The price comparison service 101 would in turn request and compile pricing data based on the client search request from a variety of sources, such as a secured web site 103, a secured web service 106 or from a client specific price catalog stored in an electronic database 108. The price comparison service requests and compiles data from all the various available resources and returns the search results 124 to the requesting client.

Many wholesalers offer their retail customers product and price search capabilities on their website. In order for the retailer to access confidential price data 104, the retailer can logon to the secured website 103, enter a user name and password, enter a search phrase, and wait for the price data to return, ascertain the best price available and then log off the secured website 103. This process is then repeated for each wholesale web site that contains pricing data. The present embodiment uses impersonation in real time 102 to emulate these steps and extract the price data to be used by the price comparison service 101.

When a client initiates a search request, through the present data processing system, he is actually initiating a request for retrieving data which already exists on a secure data base. Accordingly, a search request is synonymous with retrieving data. Both secured web sites and secure File Transfer Protocol services can act as secured data bases. Both types of services can provide information when a customer initiates a request to retrieve information through the present data processing system.

Confidential price data 107 may be accessed through a secured web service 106, which may be implemented as a web application programming interface or web API. These secured web services 106 often require client authentication. The client application would make a service request after authentication and then parse the returned data. The present embodiment uses impersonation in real time 105 to emulate these steps and extract the price data to be used by the price comparison service 101.

Confidential pricing data 112 may be accessed through a secured file transfer protocol or File Transfer Protocol (FTP) service 111. This process entails the retailer to navigate to a specific FTP location, enter a user name and password, download the available electronic price file, log off the FTP service and then search the electronic price file for the desired product and price. The present embodiment uses impersonation 110 to emulate these steps and import the price data through a price file import service 109 into an electronic database that stores confidential price data in unique, specific price catalogs 108. These client specific price catalogs 108 are then used by the price comparison service 101 when compiling client search request 100.

Confidential pricing data 114 may be accessed through an Email 113. The present embodiment imports the emailed price data through a price file import service 109 into an electronic database that stores confidential price data in unique, specific price catalogs 108. These client specific price catalogs 108 are then used by the price comparison service 101 when compiling client search request 100.

The present embodiment deals specifically with comparing secured and confidential pricing information. The present embodiment can maintain user credentials for each wholesaler user combination as demonstrated in FIGS. 4 401, 5 501, and 6 601 respectively.

Figure 2:
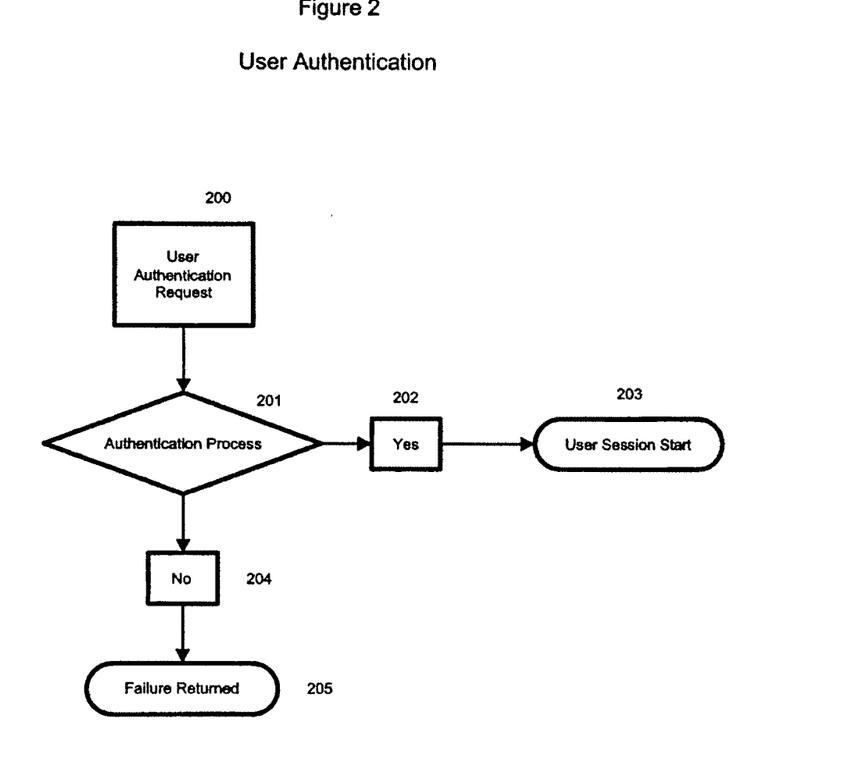
FIG. 2 is a block diagram illustrating a method of user authentication in accordance with the sample embodiment.

FIG. 2 demonstrates an example embodiment of user authentication that is necessary to protect the confidential nature of the price data. A user request authentication 200 could be implemented using the secure socket layer or SSL if the request is coming over the Internet via a web browser or computer software application.

The authentication process 201 requires the user to enter a unique user identification and a password to access the price comparison service 101. If the unique user identification and password are accepted 202, a user session begins 203, allowing the authenticated user access to the price comparison service 101. If the unique user identification and password are rejected 204, access to the price comparison service 101 is denied and the failure returned 205 to the requesting process.

Figure 3:
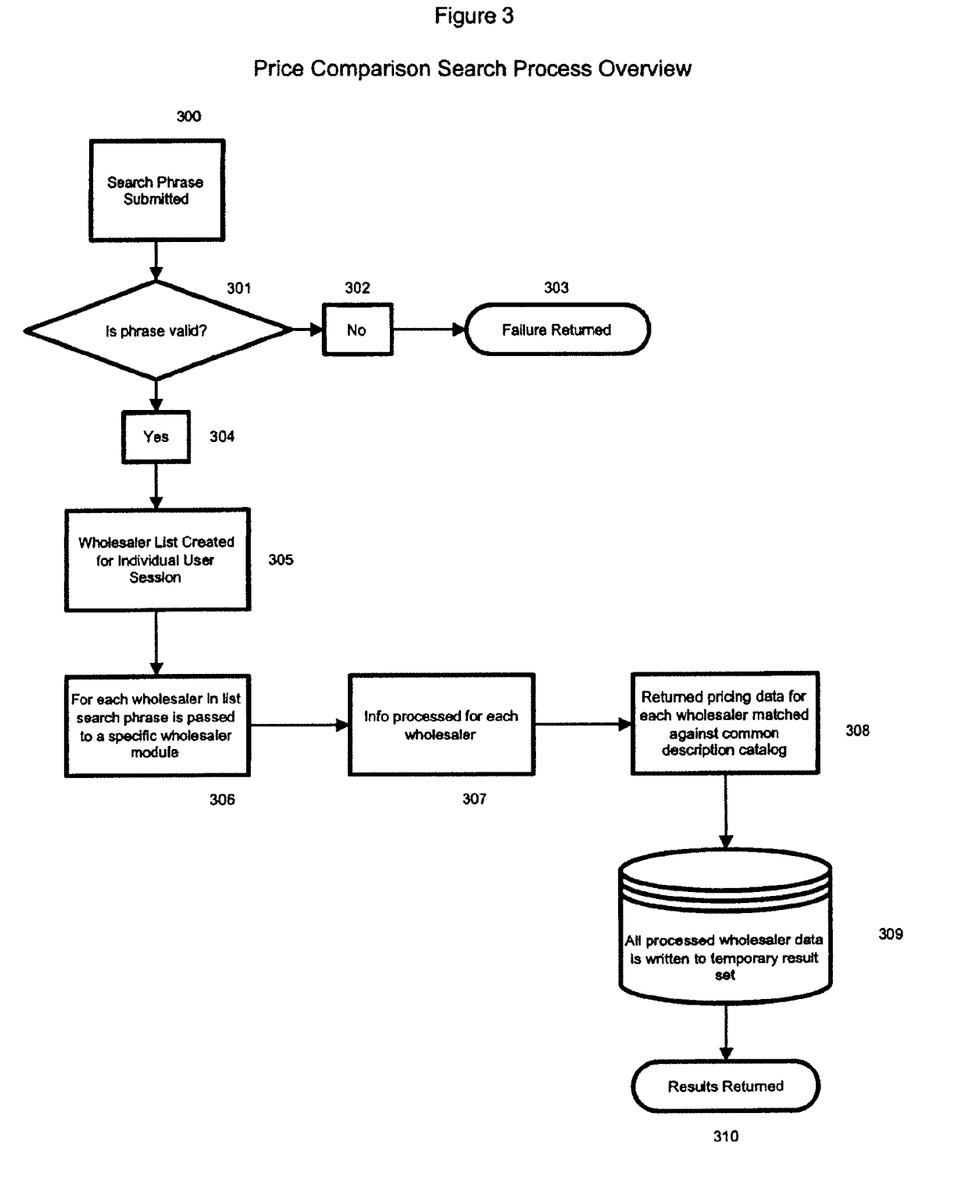
FIG. 3 is a block diagram illustrating a price comparison search process in accordance with the sample embodiment.

In an example embodiment, price comparison takes place as a result of a client search request 100. FIG. 3 is block diagram that illustrates the processing of that search request. As an example of the search process, a pharmacist may be looking for the best price for a generic drug, hydrocodone. After the user was authenticated to use the price comparison service as demonstrated in FIG. 2, the user would submit the search phrase 300 "hydrocodone."

The search phrase is validated for security purposes 301. If the phrase is invalid 302, failure is returned 303. If the search phrase is valid 304, the phrase is passed on to the price comparison service 101 along with the user session data 203 created during the authentication process.

The user session data 203 is used to create a unique list of wholesalers 305 that are available to that user. The number of wholesalers available to a user is limited only by the contractual obligations of the individual retailer. For each wholesaler in the created list 305, the search phrase 300 and the user session data 203 is then passed to a wholesaler module 306 specifically designed to process the data from each wholesaler 307 and extract the confidential price data from the designated sources 104, 107, 108 and 114. The data is returned to the price comparison service 101 and matched against a common description catalog 308. The processed data is then written as a temporary result set 309 into an electronic database. The results are then returned 310 and can be accessed and manipulated during the user session.

In an example, price comparison takes place as a result of a client search request 100. FIG. 3 illustrated the search process itself while FIG. 1 was a block diagram showing the overall system architecture needed to implement an example embodiment. The actual price comparison derives confidential price data from three sources in real time a secured web site 103, a secure web service 106 and unique, specific price catalogs 108 that are stored in an electronic database.

Figure 4:
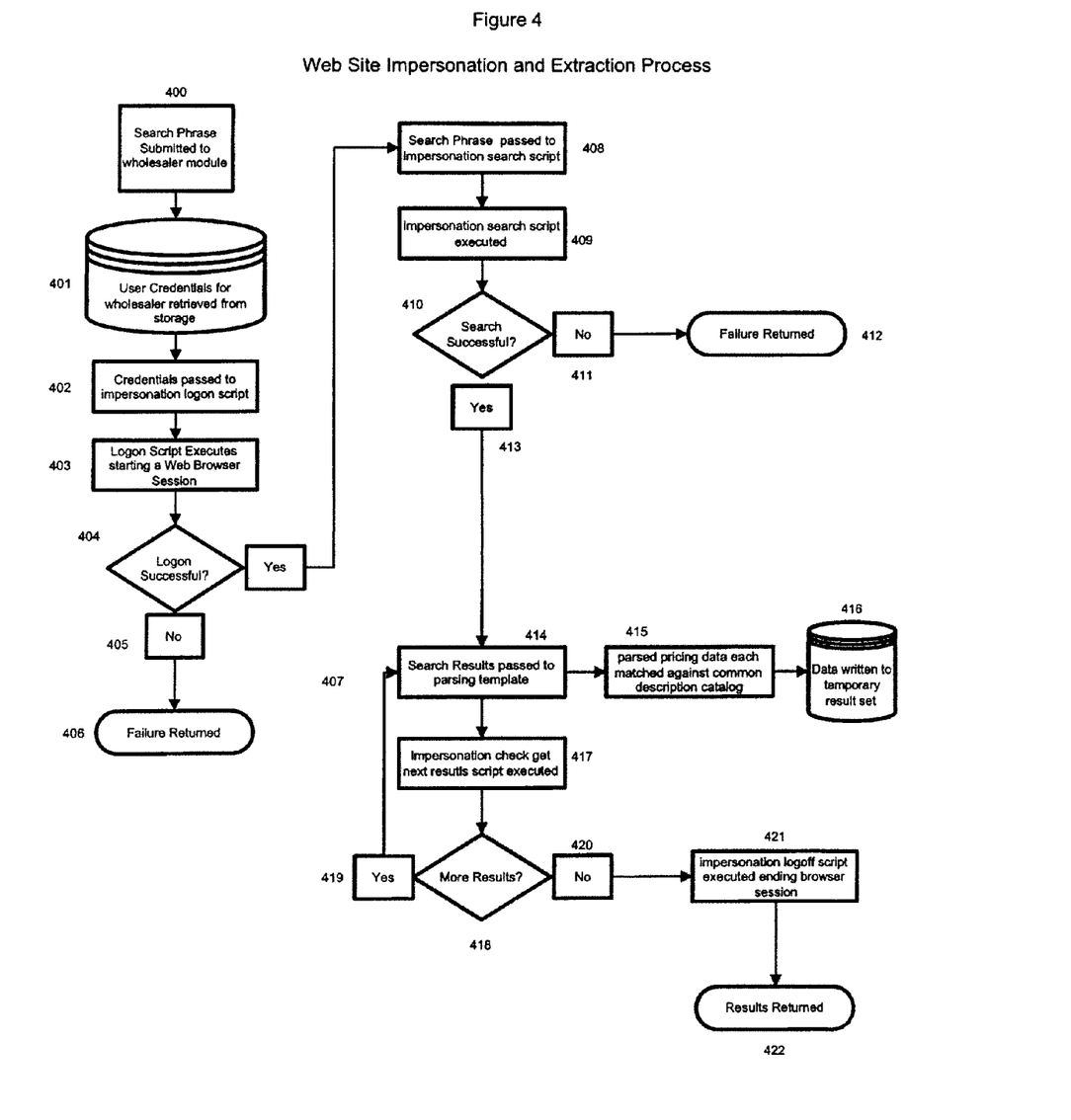
FIG. 4 is a block diagram illustrating a method using impersonation to extract confidential pricing data from a secure web site in accordance with the sample embodiment.

FIG. 4 illustrates the search and data extraction process from a secured web site 103 by impersonating a user and emulating user actions. Preferably, the user name, password and other credentials are used on the request of the authorized user. The search phrase is submitted to the wholesaler module 400 where the user credentials that identify the user are retrieved from secured storage in an electronic database 401.

The credentials are passed to a website logon script 402. The logon script is executed 403. The logon script starts a web browser session, navigates to the secure website logon URL (uniform resource locator), enters the user name credential in the logon name field, enters the password credential in the password name field and then clicks the logon button or link just as if the user had completed the task manually.

The wholesaler software module confirms the success of the logon 404. If the logon fails 405, the failure is returned to the calling process 406. If the logon is successful 407, the search phrase 400 is passed to website search script 408.

The website search script is executed using the previously created web browser session 403. The website search script navigates to the secure website product search page, enters the search phrase into the search field and the clicks the search button or link just as if the user had completed the task manually.

The wholesaler software module confirms the success of the search 410. If the search failed 411, the failure is returned 412. If the search was successful 413, the search page results are passed to a parsing template 414.

The parsing template extracts pricing data from the results and matches the data for each returned item against a common description catalog 415. The results are then written to an electronic database for temporary storage 416. The parsing template 414 checks the search results see if more data matching the search request is available. If more data is available, a get next results script is executed 417 using the previously created web browser session 403.

The script locates and clicks the next button or link button just as if the user had completed the task manually. This action causes the web browser to navigate to the next available results URL. The wholesaler software module confirms the success of the next results script 418. If there are more results 419, the results are passed to the parsing template for processing 414.

This loop of actions 414, 415, 416, 417, 418 and 419 continues until no more results are available 420. When all results have been processed, the impersonation logoff script is executed 421. The impersonation logoff script navigates to the secured web site URL containing the logoff button or link, clicks the logoff button or link and ends the browser session 403. The results are then returned 422.

Figure 5:
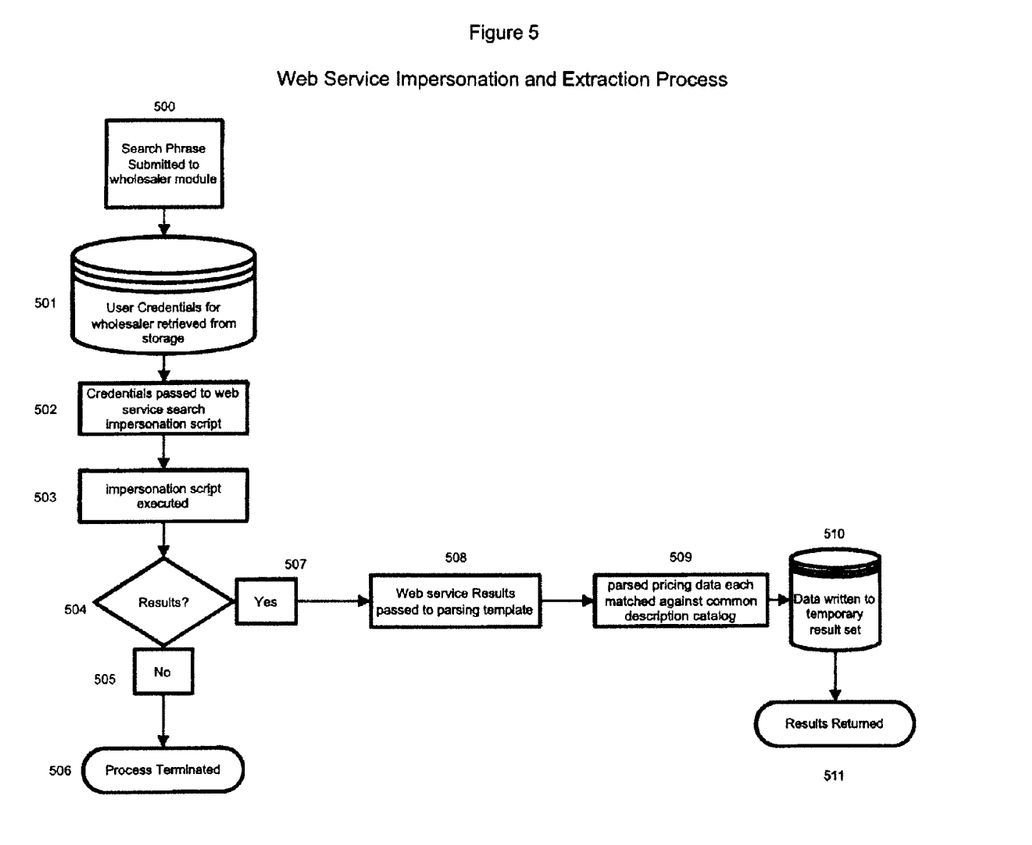
FIG. 5 is a block diagram illustrating a method using impersonation to extract confidential pricing data from a secure web service in accordance with the sample embodiment.

FIG. 5 illustrates the search and data extraction process from a secured web service 106 by using user credentials to impersonate a user accessing the web service. In this example, the search phrase is submitted to the wholesaler module 500 where the user credentials that identify the user are retrieved from secured storage in an electronic database 501.

The credentials are passed to a web service impersonation script 502. The web service impersonation script is executed 503. The web service impersonation script would utilize the published web service API to navigate to the web service location, authenticate using the retrieved user credentials 502 and extract the search results. The wholesaler software module checks for results 504. If there are no results 505, the process is terminated 506. If results exist 507, they are passed to a parsing template 508 to extract the confidential price data 107. The resulting data for each returned item is matched against a common description catalog 509. The matched results are then written to an electronic database for temporary storage 510. The results are then returned 511.

Figure 6:
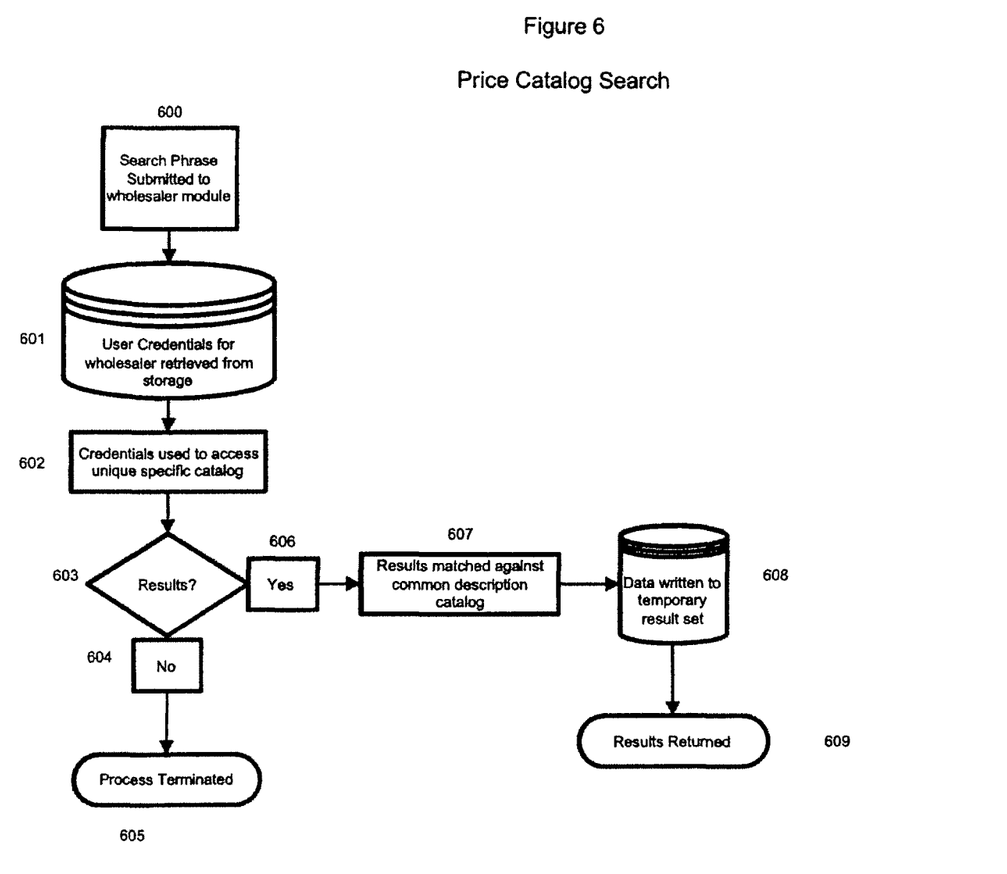
FIG. 6 is a block diagram illustrating a price comparison search against a user specific price catalog in accordance with the sample embodiment.

FIG. 6 illustrates an example utilizing a price catalog that has been created for a unique user. The unique and specific price catalog may be created from confidential price data 112 acquired through a secured FTP service 111 or confidential price data 114 received via email 113.

In this example, the search phrase is submitted to the wholesaler module 600 where the user credentials that identify the user are retrieved from secured storage in an electronic database 601.

The credentials are used to access and search the unique, specific price catalog 602 created for the user. The wholesaler software module checks for results 603. If there are no results 604, the process is terminated 605. If results exist 606, the resulting data for each returned item is matched against a common description catalog 607. The matched results are then written to an electronic database for temporary storage 608. The results are then returned 609.

Figure 7:
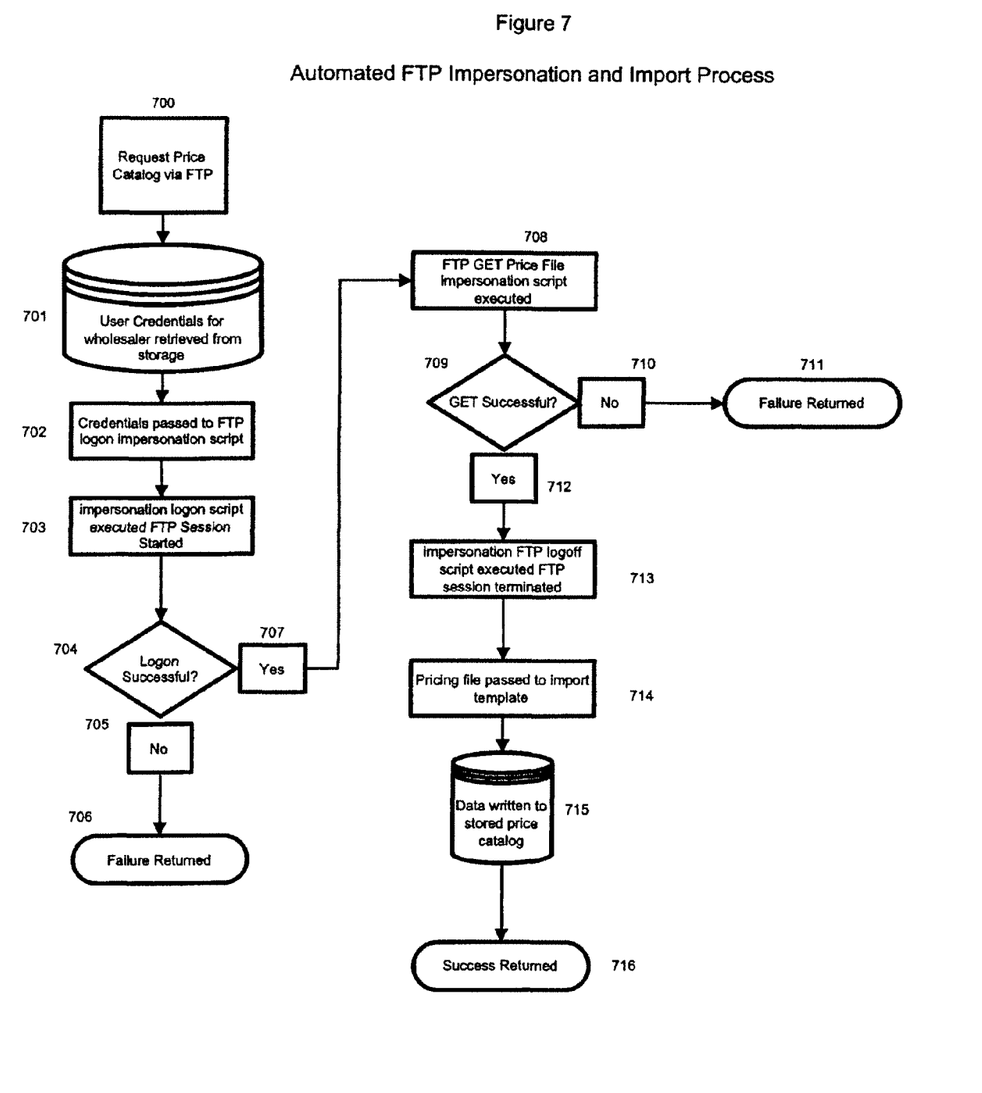
FIG. 7 is a block diagram illustrating a method using impersonation to automate downloading confidential pricing data from a secure FTP service and importing the data to a user specific price catalog in accordance with the sample embodiment.

FIG. 7 illustrates a method using impersonation to automate downloading confidential pricing data 112 from a secure FTP service and importing the data to a unique, specific price catalog in accordance with the sample embodiment. The data imported through a price file import service 109 is used in the construction of unique, specific price catalogs 108 which are stored in an electronic database and used by the price comparison service 101.

In an example, a request for a price catalog could be scheduled to happen at a specific date and time or it could be a request in real time. The request for a price catalog via FTP is submitted to the wholesaler module 700 where the user credentials that identify the user are retrieved from secured storage in an electronic database 701.

The credentials are passed to a File Transfer Protocol (FTP) logon script 702. The logon script is executed 703. The logon script starts an FTP session, navigates to the secure FTP location, enters the user name credential in the logon name field, enters the password credential in the password name field and initiates the logon just as if the user had completed the task manually.

The wholesaler software module confirms the success of the logon 704. If the logon fails 705, the failure is returned to the calling process 706. If the logon is successful 707, an FTP Get command is executed in the FTP Get Price File script 708 just as if the user had completed the task manually.

The wholesaler software module confirms the success of the GET command 709. If the GET fails 710, the failure is returned to the calling process 711. If the GET is successful 712, an FTP logoff script is executed 713 just as if the user had completed the task manually.

The retrieved price file data is passed to an import template 714 in the file import service 109. The processed data is then written to a unique, specific price catalog 715 stored in an electronic database and success is returned to the calling process 716.

Figure 8:
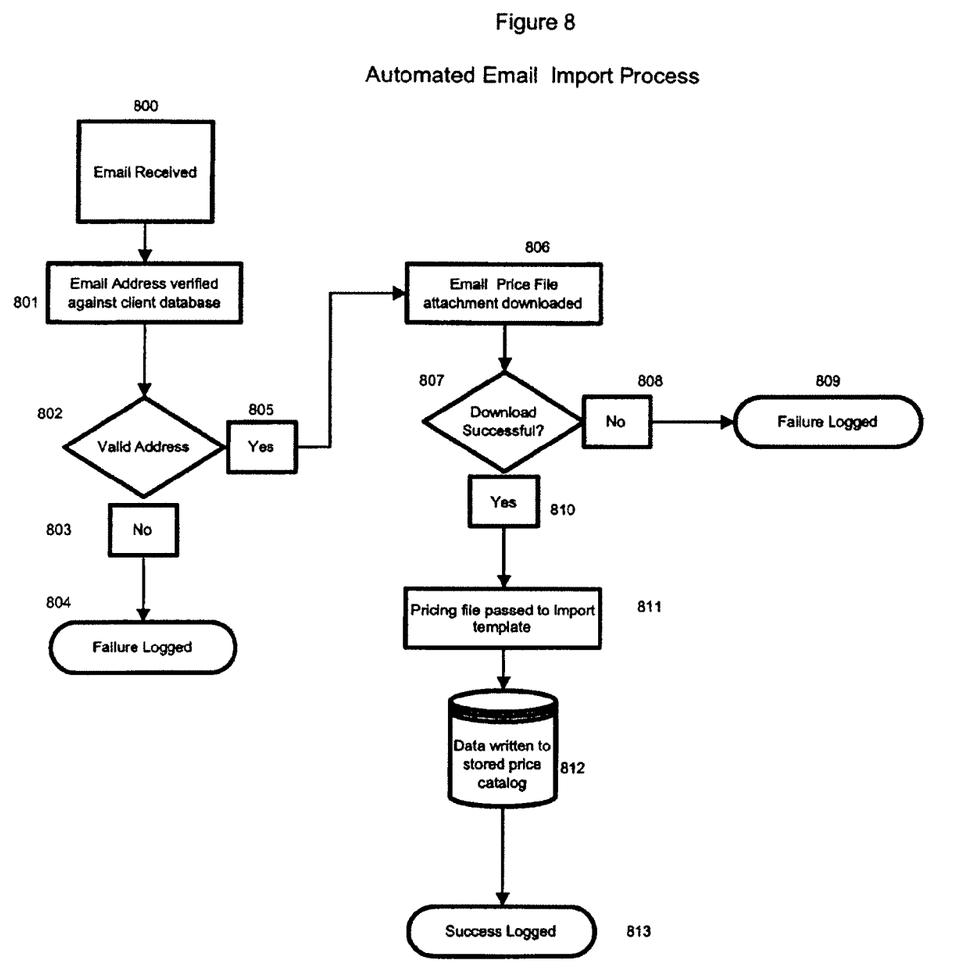
FIG. 8 is a block diagram illustrating a method using email to extract confidential pricing data and importing the data to a user specific price catalog in accordance with the sample embodiment.

FIG. 8 illustrates a method of importing confidential pricing data from an email into a unique, specific price catalog in accordance with the sample embodiment. The data imported through a price file import service 109 is used in the construction of unique, specific price catalogs 108 which are stored in an electronic database and used by the price comparison service 101.

In an example, an email is received 800, and the Email address is verified against the client database 801 and the referenced wholesaler data is retrieved and validated 802. If the address is not valid 803, the failure is logged 804. If the address is valid 805, the email price file attachment is downloaded 806. The price file download is verified 807. If the download failed 808, the failure is logged 809.

If the price file download is successful 810, the retrieved price file data is passed to an import template 811 in the file import service 109. The processed data is then written to a unique and specific price catalog 812 stored in an electronic database and success is logged 813.

The disclosed software can be web-based and used on various computers. The search results can be returned from the client search request by various means, including electronically and they may be printed.

The client may input one or more search terms, and if desired by the client, the search results may be organized into reports that may be printed by the client to create a tangible output. A wide variety of output formats are available depending upon the preference of the client. The following examples illustrate typical tangible printed outputs. Many other printed outputs besides those shown in the examples are possible.

Example 1

This example shows a typical report for a request for information retrieval from 3 wholesalers and 2 products and two package sizes for one product.

Acarbose 100 MG
Package Size 100 EA

| NDC Number | Wholesaler | Product ID | Prod Description | Manufacturer | Unit Price | Price | Stock |
|---|---|---|---|---|---|---|---|
| 16252052501 | Wholesaler1 | 408xxxx | ACARBOSE | Manf 1 | 000.5397 | $53.97 | Y |
| 16252052501 | Wholesaler2 | 409xxxx | ACARBOSE | Manf 2 | 000.5499 | $54.99 | Y |
| 00054014225 | Wholesaler3 | 410xxxx | ACARBOSE | Manf 3 | 001.2090 | $120.90 | Y |

Potential Savings $66.93

Albuterol Sulf 4 MG
Package Size 100 EA

| NDC Number | Wholesaler | Product ID | Prod Description | Manufacturer | Unit Price | Price | Stock |
|---|---|---|---|---|---|---|---|
| 53489017701 | Wholesaler1 | 208xxxx | ALBUT. SULF | Manf 1 | 000.0847 | $8.47 | Y |
| 53489017701 | Wholesaler2 | 209xxxx | ALBUT. SULF | Manf 2 | 000.0903 | $9.03 | N |
| 53489017701 | Wholesaler3 | 210xxxx | ALBUT. SULF | Manf 3 | 000.0927 | $9.27 | Y |

Potential Savings $0.80

Package Size 500 EA

| NDC Number | Wholesaler | Product ID | Prod Description | Manufacturer | Unit Price | Price | Stock |
|---|---|---|---|---|---|---|---|
| 53489017705 | Wholesaler1 | 211xxxx | ALBUT. SULF | Manf 1 | 000.0801 | $40.05 | N |
| 53489017705 | Wholesaler2 | 212xxxx | ALBUT. SULF | Manf 2 | 000.0889 | $44.46 | Y |

Potential Savings $4.41

Example 2

This example shows a typical report for a request for information retrieval from 3 wholesalers and a single product.

Acarbose 100 MG
Package Size 100 EA

| NDC Number | Wholesaler | Product ID | Prod Description | Manufacturer | Unit Price | Price Stock |
|---|---|---|---|---|---|---|
| 16252052501 | Wholesaler2 | 408xxxx | ACARBOSE | Manf 1 | 000.5397 | $53.97 Y |
| 16252052501 | Wholesaler1 | 409xxxx | ACARBOSE | Manf 1 | 000.5499 | $54.99 N |
| 00054014225 | Wholesaler3 | 410xxxx | ACARBOSE | Manf 2 | 000.5880 | $58.80 N |

-continued

| NDC Number | Wholesaler | Product ID | Prod Description | Manufacturer | Unit Price | Price | Stock |
|---|---|---|---|---|---|---|---|
| 00026286251 | Wholesaler2 | 411xxxx | PRECOSE | Manf 3 | 001.0097 | $100.97 | N |
| 00054014225 | Wholesaler1 | 412xxxx | ACARBOSE | Manf 2 | 001.2090 | $120.90 | Y |

What is claimed is:

1. A data processing system for comparing prices among various wholesalers, comprising:
   (a) computer processor means for processing data;
   (b) storage means for storing data on a storage medium;
   (c) first means for retrieving stored data;
   (d) second means for receiving a search request from a client;
   (e) third means for real time impersonation;
   (f) fourth means for requesting confidential pricing data from wholesalers having secure websites;
   (g) fifth means for compiling confidential pricing data, not available to the general public from a web site, from wholesalers to prepare a search report; and
   (h) means for transmitting the report to a client.

2. A data processing system according to claim 1, wherein the real time impersonation means is a process comprising the steps of:
   (e1) retrieving client credentials from storage;
   (e2) passing client credentials to impersonation script; and
   (e3) executing impersonation script.

3. A data processing system according to claim 2 further comprising a means for user authentication prior to initiating a price comparison.

4. A data processing system according to claim 3 further comprising a means for printing a tangible report.

5. A data processing system according to claim 2 further comprising a means for printing a tangible report.

6. A data processing system according to claim 1 further comprising a means for user authentication prior to initiating a price comparison.

7. A data processing system according to claim 6 further comprising a means for user authentication prior to initiating a price comparison.

8. A data processing system according to claim 7 further comprising a means for printing a tangible report.

9. A data processing system according to claim 6 further comprising a means for printing a tangible report.

10. A data processing system according to claim 1 further comprising a means for printing a tangible report.

11. A data processing system for comparing prices among various wholesalers, comprising:
    (a) computer processor means for processing data;
    (b) storage means for storing data on a storage medium;
    (c) first means for retrieving stored data;
    (d) second means for receiving a search request from a client;
    (e) third means for real time impersonation;
    (f) fourth means for requesting confidential pricing data from wholesalers having secure websites;
    (g) fifth means for compiling confidential pricing data, not available to the general public from a web site, from wholesalers to prepare a search report; and
    (h) sixth means for writing information to a stored price catalog.

12. A data processing system according to claim 11, wherein the real time impersonation means is a process comprising the steps of:
    (e1) retrieving client credentials from storage;
    (e2) passing client credentials to impersonation script; and
    (e3) executing impersonation script.

13. A data processing system according to claim 12 further comprising a means for printing a tangible report.

14. A data processing system according to claim 11 further comprising a means for user authentication prior to initiating a price comparison.

15. A data processing system according to claim 14 further comprising a means for printing a tangible report.

16. A data processing system according to claim 11 further comprising a means for user authentication prior to initiating a price comparison.

17. A data processing system according to claim 16 further comprising a means for printing a tangible report.

18. A data processing system according to claim 11 further comprising a means for printing a tangible report.

* * * * *